Aug. 14, 1956 W. W. PAGET 2,758,826
DRUM TYPE CUTTING HEAD FOR CONTINUOUS MINING MACHINE
Filed March 30, 1951 11 Sheets-Sheet 3
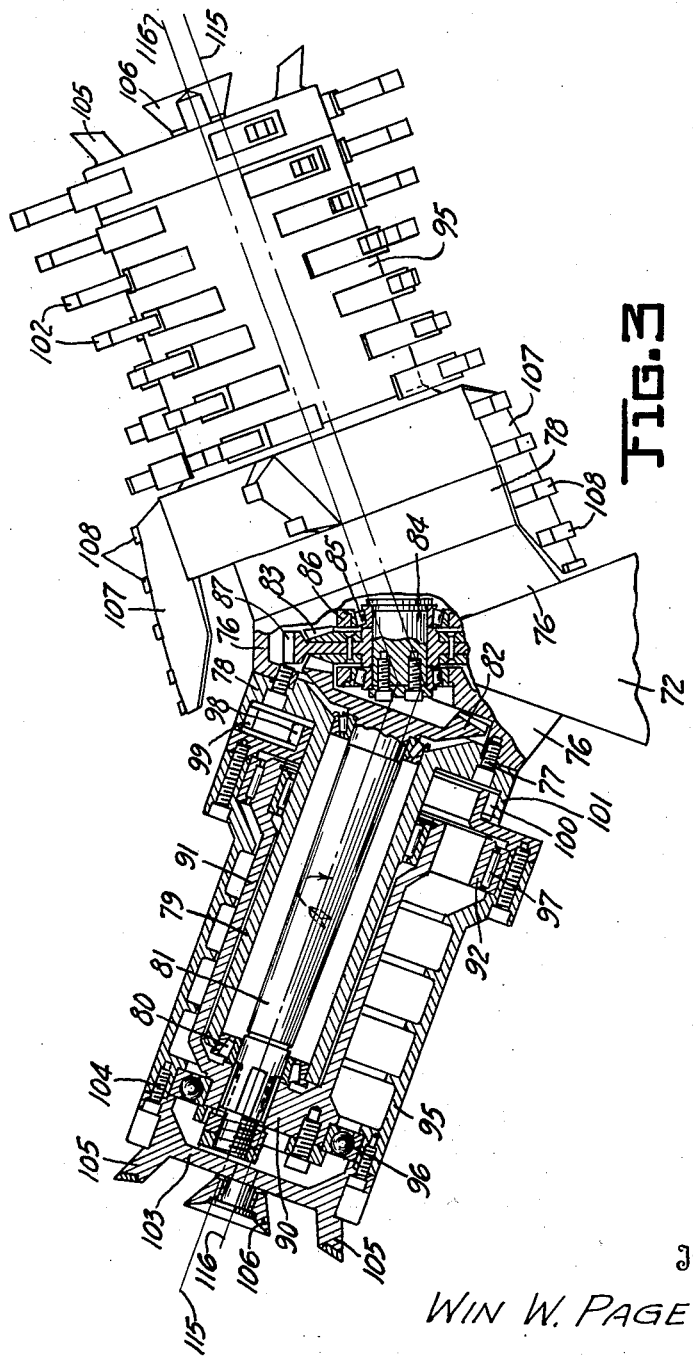
Inventor
WIN W. PAGET.
By Oltsch & Knoblock
Attorneys.

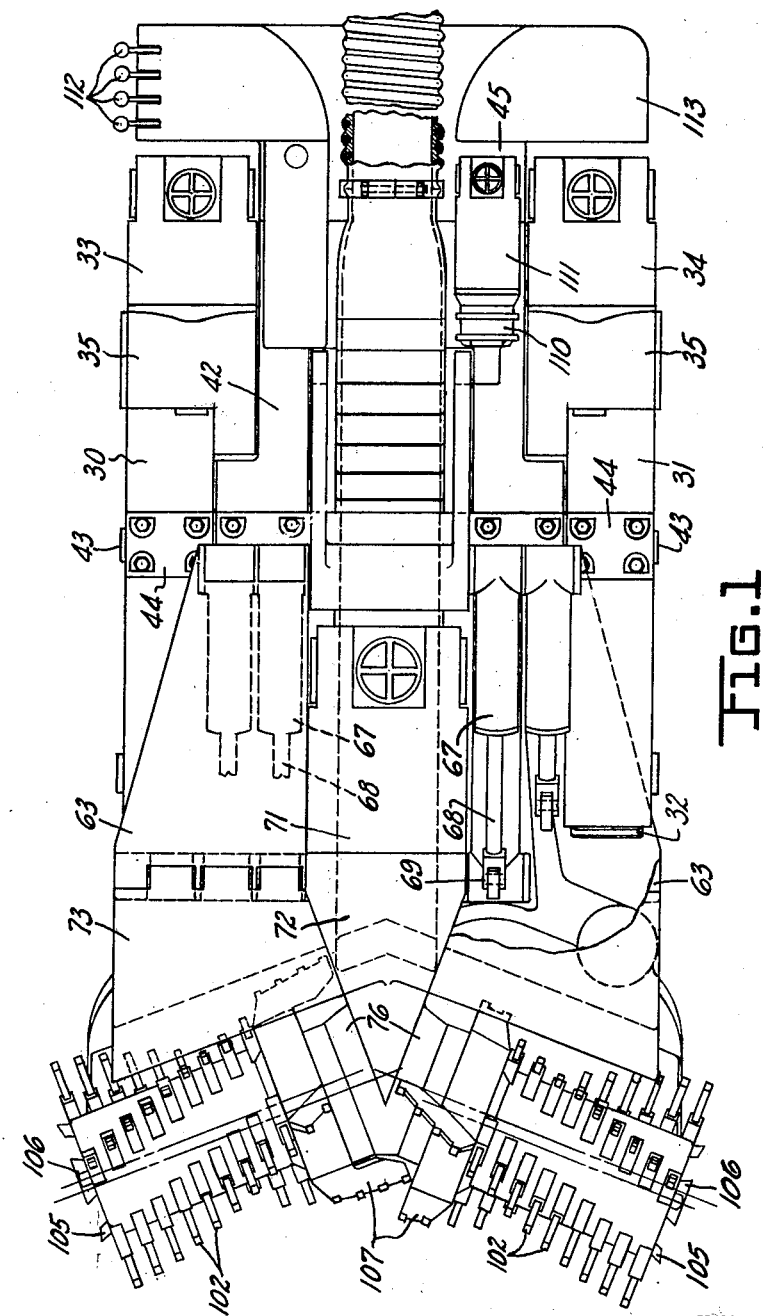

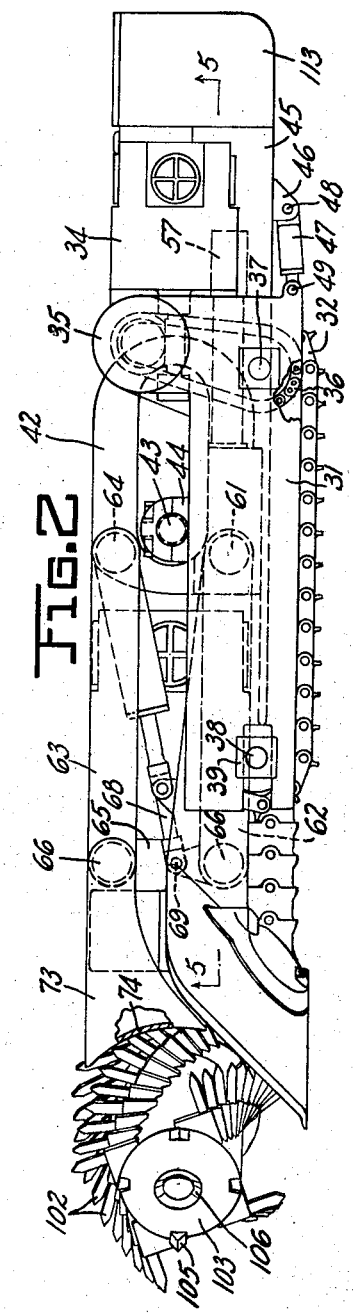

Aug. 14, 1956 W. W. PAGET 2,758,826
DRUM TYPE CUTTING HEAD FOR CONTINUOUS MINING MACHINE
Filed March 30, 1951 11 Sheets-Sheet 4
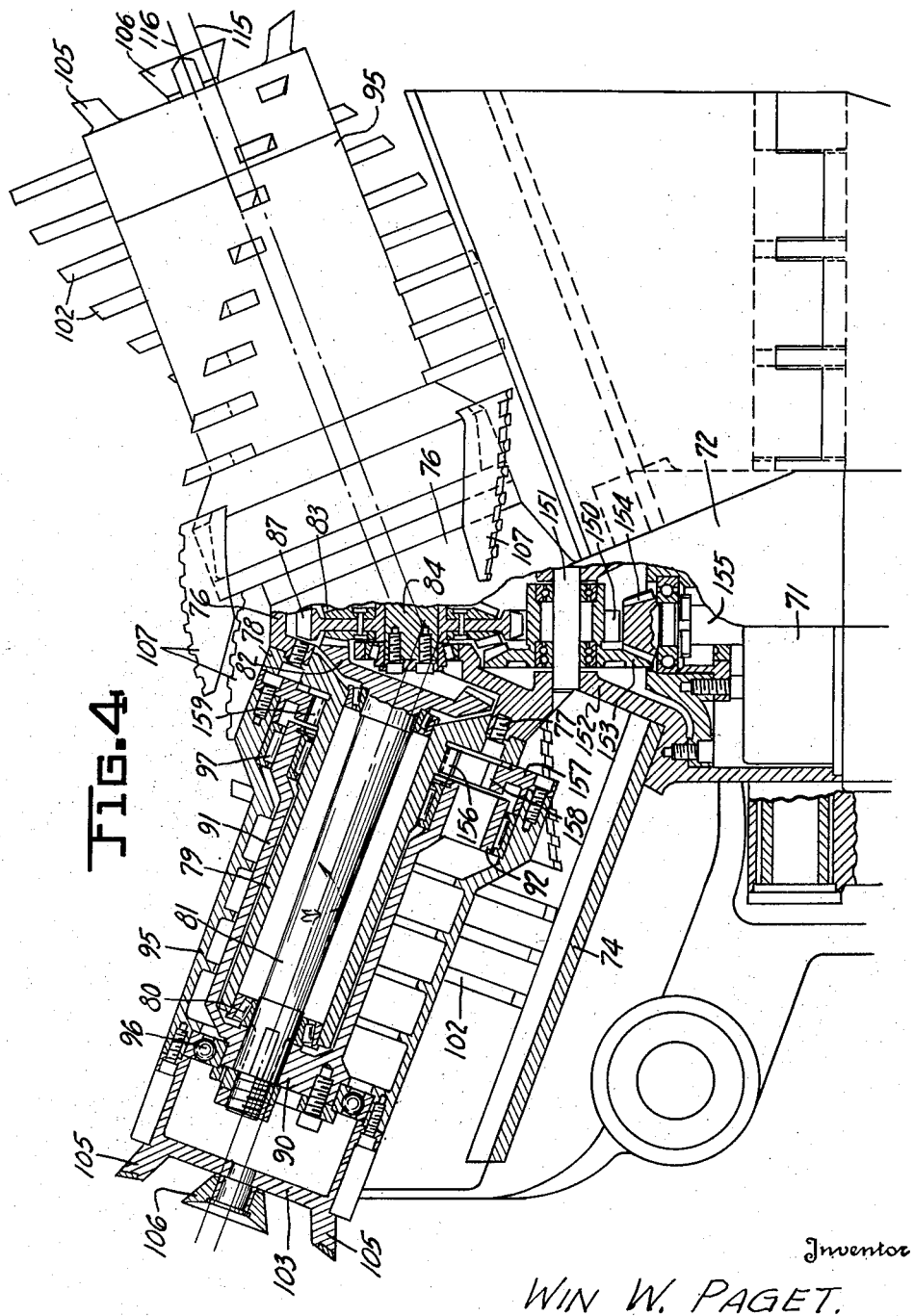
Inventor
WIN W. PAGET.
By Oltsch + Knoblock
Attorneys.

Aug. 14, 1956   W. W. PAGET   2,758,826
DRUM TYPE CUTTING HEAD FOR CONTINUOUS MINING MACHINE
Filed March 30, 1951   11 Sheets-Sheet 5
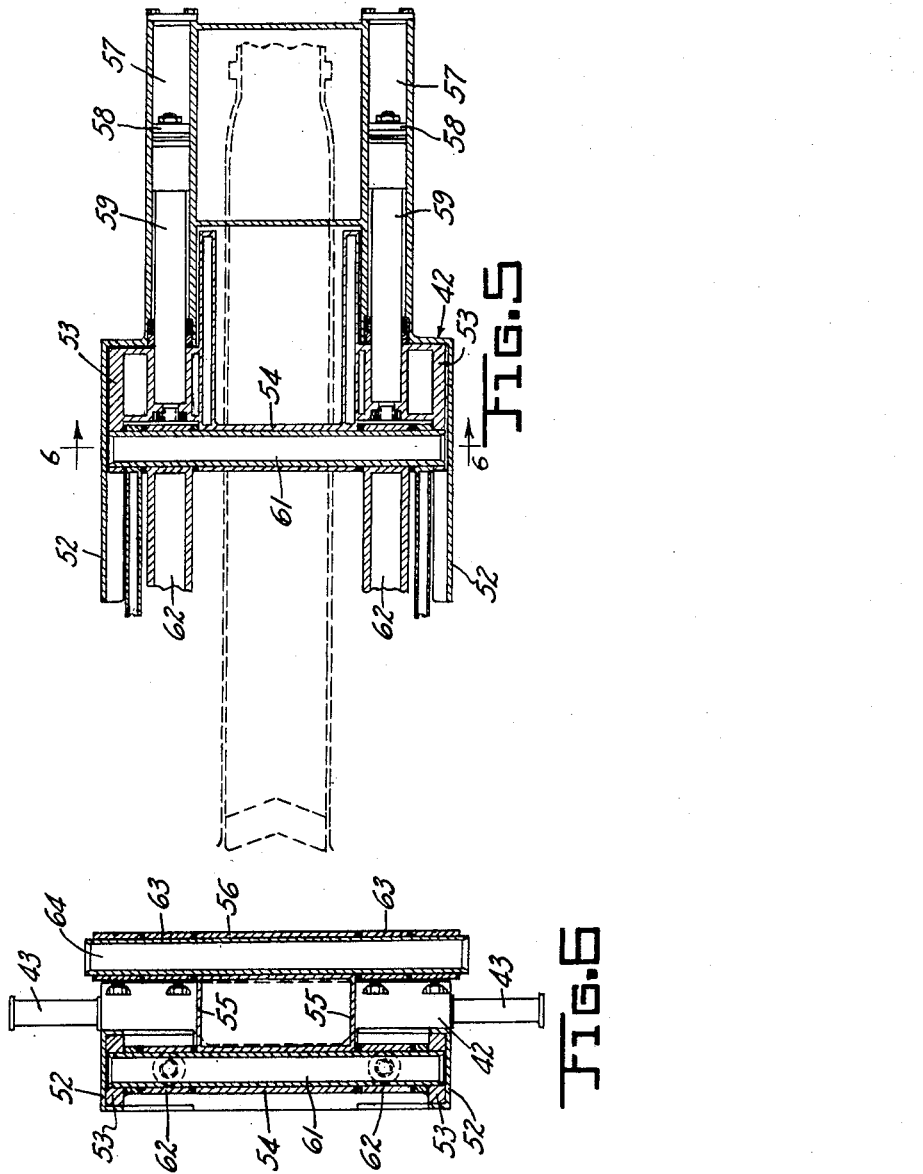
INVENTOR.
WIN W. PAGET
BY
Oltsch & Knoblock
ATTORNEYS Aug. 14, 1956 W. W. PAGET 2,758,826
DRUM TYPE CUTTING HEAD FOR CONTINUOUS MINING MACHINE
Filed March 30, 1951 11 Sheets-Sheet 6

INVENTOR.
WIN W. PAGET
BY
Oltsch & Knoblock
ATTORNEYS

Aug. 14, 1956 W. W. PAGET 2,758,826
DRUM TYPE CUTTING HEAD FOR CONTINUOUS MINING MACHINE
Filed March 30, 1951 11 Sheets-Sheet 7
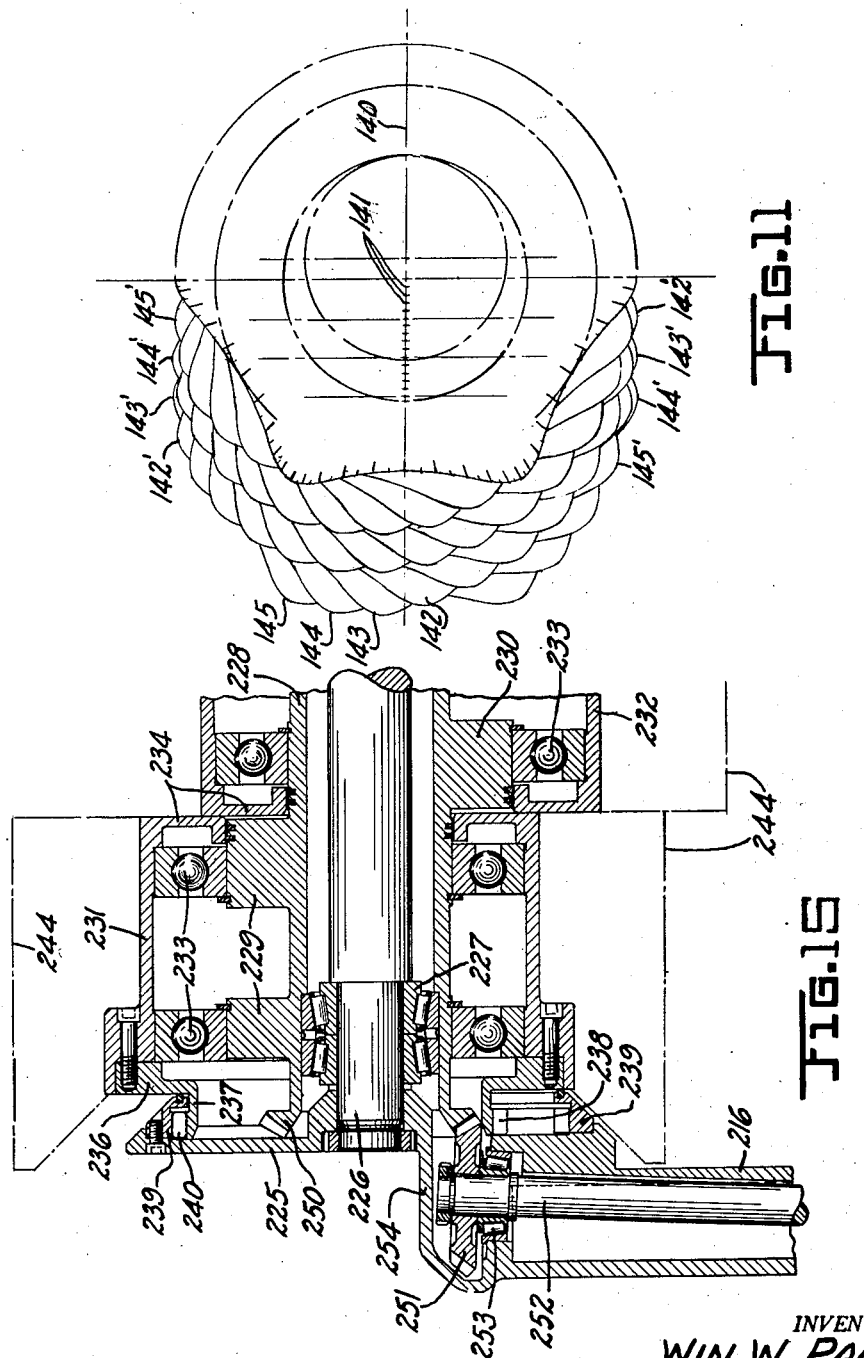
INVENTOR.
WIN W. PAGET
BY
Ottsch & Knoblock
ATTORNEYS Aug. 14, 1956 W. W. PAGET 2,758,826
DRUM TYPE CUTTING HEAD FOR CONTINUOUS MINING MACHINE
Filed March 30, 1951 11 Sheets-Sheet 8
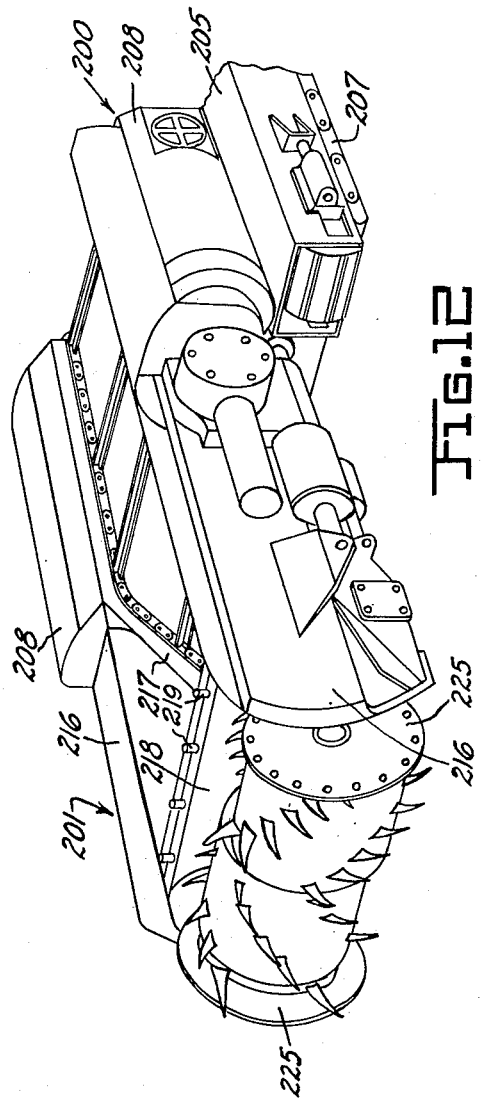
INVENTOR
WIN W. PAGET
BY
Oltsch & Knoblock.
ATTORNEYS Aug. 14, 1956 W. W. PAGET 2,758,826
DRUM TYPE CUTTING HEAD FOR CONTINUOUS MINING MACHINE
Filed March 30, 1951 11 Sheets-Sheet 9

INVENTOR.
WIN W. PAGET
BY
Oltsch & Knoblock.
ATTORNEYS

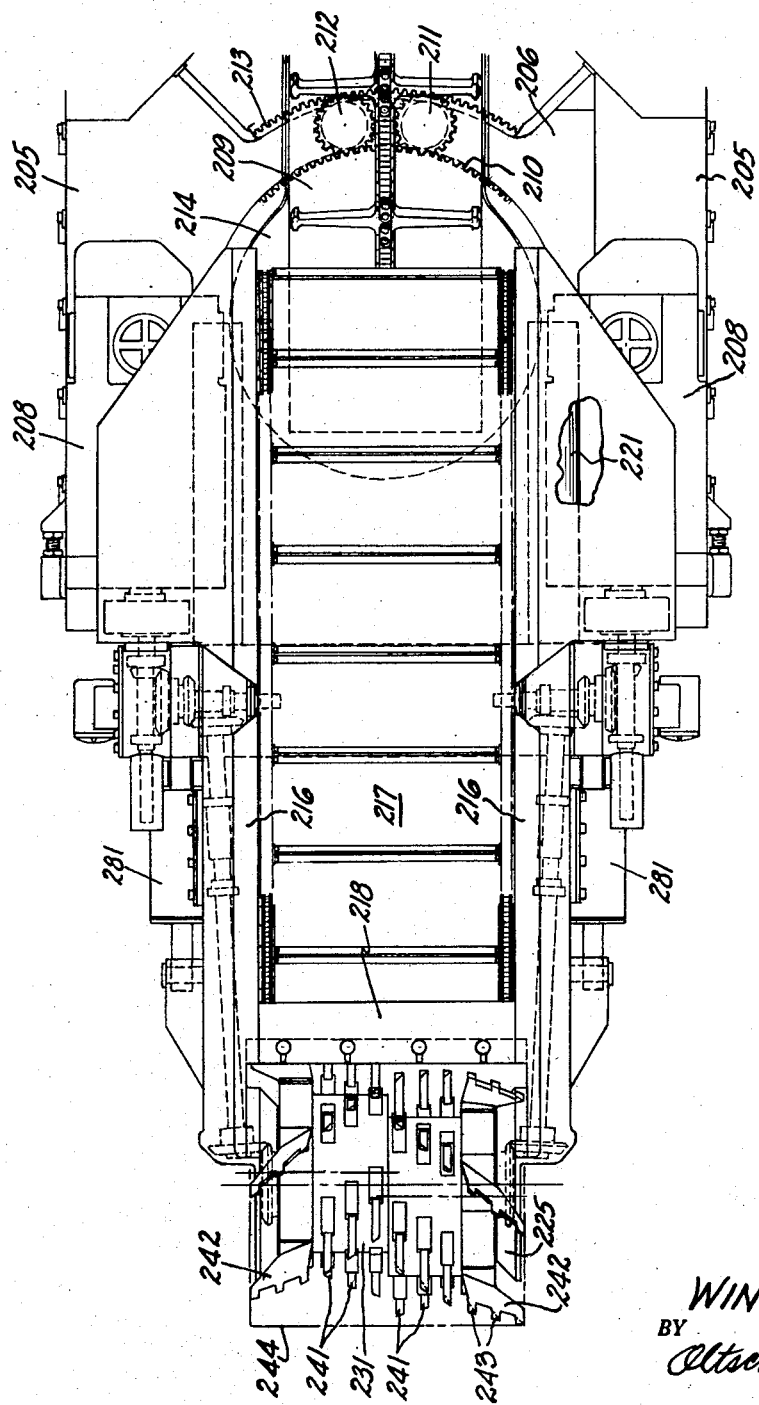

Aug. 14, 1956 W. W. PAGET 2,758,826
DRUM TYPE CUTTING HEAD FOR CONTINUOUS MINING MACHINE
Filed March 30, 1951 11 Sheets-Sheet 11

INVENTOR.
WIN W. PAGET
BY
Altach & Knoblock
ATTORNEYS

United States Patent Office 2,758,826
Patented Aug. 14, 1956

2,758,826

DRUM TYPE CUTTING HEAD FOR CONTINUOUS MINING MACHINE

Win W. Paget, Mountain Brook, Ala.

Application March 30, 1951, Serial No. 218,461

14 Claims. (Cl. 262—26)

This invention relates to a continuous mining machine, and more particularly to a machine which is capable of operating continuously to mine coal and similar substances.

Several machines are now being manufactured in the nature of continuous mining devices particularly usable for mining coal. Several serious difficulties have been encountered with such devices. Included among such difficulties has been an inability to control with sufficient accuracy the size of the particles of coal being mined, and particularly inability to hold to an acceptable small proportion the amount of "fines," that is, the quantity of very small particles of coal.

Heretofore the machines employed for continuously mining coal have been of two types. One type uses a cutter head consisting of a number of auger type cutting elements which are so arranged as to cut a clearance for the entire machine. In other words, the device cuts a passageway somewhat larger than the frontal area of the machine so that the machine may proceed directly forward as it mines the coal. A second type of machine employs a number of flexible cutter members comparable to cutter chains and combined in one cutter unit or assembly smaller than the frontal area of the machine.

The cutting elements of either the chain type or the auger type have one great difficulty in common. This difficulty is that successive cutting elements, or the same cutting element on successive rotations, follows the same path, and heavy feed pressures must be exerted to force the cutting element into the coal fast enough to enable the mining or cutting of particles larger than dust particles. Obviously, the amount of feed pressure required will depend in part upon the size of the cutting elements so that, in the case of a mining machine which cuts clearance for the entire machine, it is necessary that a very great feed pressure be exerted. The requirement for great feed pressure makes necessary either bracing of the machines to permit exertion of the pressure, which bracing is apt to be dangerous, or requires that the machine be made very heavy, which is hard on the floor of the mine. Even when these two conditions of bracing and weight are satisfactorily met, still another difficutly manifests itself. This difficulty is that the rate at which the coal is cut causes a jamming of the conveying means. In other words, so much coal is cut down and the rate of advance must be so fast, that the mechanism cannot satisfactorily carry away the coal.

Another condition exists in the case of machines using a cutter chain type of cutting element, and that is the requirement for a cutter chain structure of great strength together with the provision of means for transmitting the heavy cutter reactions to the frame. In cases of machines of this character, especially those which are heavily loaded, if material is found in the coal which is foreign to coal and harder than coal, such as chert, the cutting elements are likely to be damaged when they encounter such foreign substance, before the operation can be stopped.

It is the primary object of this invention to provide a device wherein the limitations and disadvantages aforementioned can be overcome and to provide a machine which effectively breaks down coal at the working face in a mine.

A further object is to provide a device of this character which mines coal in particles of substantially uniform and large size, and which particles are broken down at a rate slow enough for efficient operation of a loading machine.

A further object is to provide a device of this character wherein a comparatively few cutting points are in contact with the coal at one time, thus enabling the exercise at each of those points of a pressure as great as is required for an efficient mining of particles of large size.

A further object is to provide a device of this character adapted to cut coal in a manner so that it falls free by gravity from a limited part of the working face of the mine at any given instant, which device is characterized by progressive and continuous change from side to side of the point at which coal is being broken from one instant of time to another.

A further object is to provide a device of this character which is capable of progressively cutting into and breaking into particles of large size the material in the working face of the mine and which operates progressively to effectively control both the depth of the cut and the height of the cut at any given pass.

In the drawings:

Fig. 1 is a top plan view of a machine constituting one embodiment of the invention.

Fig. 2 is a side view of the machine.

Fig. 3 is a plan view of the cutting element of the machine with parts shown in axial section.

Fig. 4 is a plan view, with parts shown in section, of a slightly modified embodiment of the cutting element.

Fig. 5 is a longitudinal horizontal sectional view taken on line 5—5 of Fig. 2.

Fig. 6 is a vertical sectional view taken on line 6—6 of Fig. 5.

Fig. 11 is a schematic view illustrating the paths of the cutting elements as the cutter is fed forward to the left for a distance equal to about one-half of its diameter.

Fig. 12 is a perspective view of a portion of a device constituting another embodiment of the invention, wherein the device has a smaller cutting head and does not cut a clearance for itself.

Fig. 14 is a top view of the front portion of the machine illustrated in Fig. 13.

Fig. 15 is a fragmentary axial sectional view taken on line 15—15 of Fig. 13 and illustrating the cutter head of the embodiment of the device illustrated in Fig. 12.

Figure 9:
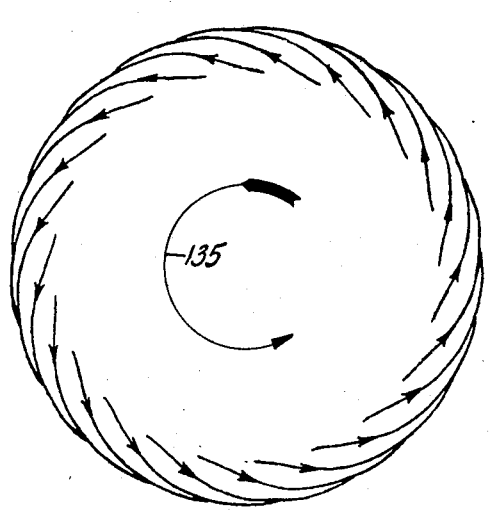
Fig. 9 is a schematic view similar to Fig. 7, illustrating diagrammatically the cutting action of the cutting head illustrated in Fig. 4.

*The embodiment of Figs. 1 to 6*

Referring to the drawings, Figs. 1 to 6, inclusive, illustrate the construction of a machine which is capable of cutting clearance for the entire machine as it advances.

The device is supported upon tractive means and includes frames 30 and 31, around which are trained endless tracks or treads 32. It will be understood that any suitable sprocket members and guides (not shown) are carried by the endless track frame parts 30 and 31. Driving means, which preferably constitute electric motors 33 and 34, are provided to drive the treads 32. The driving means will preferably include speed reducers 35 which drive the chains, belts or other drive transmission means 36, which extend from the speed reducer 35 to a driving sprocket (not shown) mounted upon the rear or drive shaft 37 of each endless track drive and are mounted in one of the frame members 30, 31. The front sprocket shaft 38 of each track member is preferably journaled in a bearing block 39 adjustable longitudinally in the frame 30, 31 to take up slack in a manner well understood in the art.

Two tractive members or units are provided spaced apart and support a main frame 42. The frame 42 has trunnions 43 projecting from opposite sides thereof in axial alignment, and bearing or journal parts 44 project upwardly from the tractive frames 30, 31 substantially mid-length thereof and journal the trunnion members 43. The main frame 42 includes a rearwardly projecting portion 45, best seen in Fig. 2, having a pair of laterally spaced parts 46 positioned rearwardly of the tractive frame 30, 31. An hydraulic cylinder piston unit 47 is pivotally connected at 48 to each projection 46 of the frame 45 and at 49 to the lower rear end portion of each of the tractive frame units 30, 31. The hydraulic units 47 provide means for leveling the machine, and particularly for leveling the frame 42 to hold the same in substantially horizontal position.

The main frame 42 includes elongated longitudinal guides 52 at each side thereof, as best seen in Figs. 5 and 6. A slide member is carried by the frame and includes slide shoes 53 at each side thereof which shoes are shiftable lengthwise in the longitudinal guides 52. The slide shoes 53 are rigidly interconnected by and form parts of a shiftable assembly which includes a rigid transverse tube 54 interconnecting the slide members 53, the rigid vertical frame parts 55 and an upper rigid tube or sleeve 56 spaced above and parallel to the tube 54 and spaced above the level of the trunnions 43 and parallel to said trunnions. The main frame 42 includes a pair of cylinders 57 extending longitudinally thereof at opposite sides thereof and at the level of and rearwardly from the lower cross-tube 54 and the slides 53. Each cylinder 57 has an hydraulic piston 58 reciprocable therein and connected by means of a piston rod 59 with the slide members 53. The piston cylinder units 57, 58 may be either the double-acting type or of the single-acting type. If of the single-acting type they will be of such character that the hydraulic forces acting thereon are adapted to urge the pistons 58 forwardly, that is, to the left as viewed in Figs. 2 and 5.

Each of the tubular members 54 and 56 may constitute a pair of interfitting tubes and, as here shown, the inner tube 61 received within the tube or sleeve 54 projects beyond the ends of said sleeve and has clearance with the slide shoes 53 at its ends. These projecting end portions journal the rear ends of a pair of forwardly projecting rigid arms 62 in laterally spaced relation and equispaced from the longitudinal center of the device. A second pair of rigid forwardly projecting arms 63, of which a portion only is shown at the lower part of Fig. 1, are pivoted at their rear ends upon an inner tube 64 journaled within the upper cross-tube 56 of the slide unit.

At their forward ends the arms 62 and 63 are interconnected by a cutter mounting member 65 which is pivoted thereto at 66 and cooperates therewith to define a parallelogram arrangement. It will be understood that there are two of these parallelogram arrangements, one at each side of the machine. A pair of hydraulic cylinders 67 are provided. Each cylinder 67 is pivoted at one end about the pivot member 64 and each hydraulic cylinder has a piston with a piston rod 68 which extends forwardly and is pivotally connected at 69 to a part carried by the front end of the lower arm 62 of each parallelogram. The hydraulic units 67 are preferably double-acting units, and it will be apparent that, upon application of hydraulic pressure to cause the piston stem 68 to move to the right as viewed in Figs. 1 and 2, the arms 62 and 63 will be swung upwardly from the position illustrated in Fig. 2 about the pivots 61 and 64 of the slidable unit of the device, thus raising member 65 without tilting it.

An electric motor 71 is positioned between the two sets of parallelogram members, being mounted upon the cutter mounting member 65 between the sets of parallelogram members, and preferably at the transverse center of the machine. Member 65 of the motor housing includes a rigid triangular forwardly projecting part 72, as best seen in Fig. 1, which projects forwardly of the parallelogram units and is positioned therebetween with its apex lying substantially in the longitudinal center of the machine and its sides extending in equiangular relation to the longitudinal center line. The cutter mounting member 65 includes or mounts parts 73 which extend on opposite sides of the triangular or pointed housing projection 72 and each part 73 has a concave curved front wall 74 extending substantially perpendicular to the adjacent outer side surface of the central triangular projection 72. The walls 74 are curved to arcuate form centered about axes extending perpendicularly to the adjacent side face of the triangular housing 72 and located in forwardly spaced relation to the forward end of each part 73.

The cutter head

Referring now to Fig. 3 of the drawings, the triangular housing part 72, at the apex thereof projecting forwardly from the curved front walls 74 of the part 73, has annular lateral projections 76 which preferably are of frusto-conical shape with their axes intersecting at the longitudinal center line of the triangular housing part 72 and extending in equiangular relation to the longitudinal center line of the part 72 and horizontally laterally outwardly when the parallelogram arms 62 and 63 are positioned horizontally. To each projection 76 is fixedly secured, as by bolts 77, the outer portion of an annular member 78. An elongated concentric tubular member 79 projects outwardly from each annular member 78. Bearings are mounted within the tubular member 79 at the inner and outer ends thereof, such as the bearings 80 shown at the outer end of the tubular member 79. These bearings journal a shaft 81 having a bevel gear 82 at its inner end adjacent to and spaced inwardly from the annular member 78 and meshing with a bevel gear 83 mounted on a transverse shaft 84 journaled by bearings 85 in parts 86 of the triangular housing 72. The bevel gears 83 are secured at opposite sides of the web of a spur gear 87 to form a single gear unit therewith which is journaled in the bearings 85. The spur gear 87 meshes with suitable gearing housed within the part 72 and driven by the motor 71.

The outer end of each shaft 81 is splined to effect a driving connection with the hub portion 90 of a sleeve 91 which encircles the tube 79. The hub 90 constitutes an eccentric, and a second eccentric 92 is formed on the inner end of the sleeve 91. The two eccentrics 90 and 92 are circular in shape and the centers thereof are so spaced from the axis of rotation thereof that each has the same extent of eccentric throw, and the angular displacement of the true center of each member 90, 92 from the axis of rotation thereof is the same.

A carrier or drum 95, here shown as cylindrical, but which may be frusto-conical or of polygonal shape in cross section, is journaled to rotate about each sleeve 91 by means of bearings, such as the bearings 96, which are adapted to take end thrust, and the bearings 97. In the construction illustrated in Fig. 3, a spur gear 98 is mounted upon the inner end of the drum 95 and meshes at 100 with an internal stationary spur gear 99 carried by a cylindrical flange 101 projecting from annular stationary member 78 and encircling the inner end of the drum 95 which mounts the gear 98.

The two drums 95, which are mounted as above described, are positioned at the forward end of the machine in fixed relation to one another, diverging angularly forwardly from the center of the machine. The extent to which the members 95 project laterally is greater than the width of the remainder of the machine, as best seen in Fig. 1, where the rear outer portions of the drums 95 project laterally beyond the endless track frames 30, 31, the main frame 45, and the parallelogram arms 62, 63 and 73. Furthermore, it will be apparent that at the foremost part of each drum, at the inner ends thereof, the two drums are positioned close to each other, being separated only by the width of the projecting member 76.

Each of the drums carries a plurality of cutting members 102 projecting from the periphery thereof. The cutting members or elements 102 may be of any form and may constitute cone points, chisel points, blade members, or like devices, possessing great strength and capable, when pressed against a face of coal while the drums are rotating, to cut, penetrate or otherwise break down the coal. In the preferred embodiment the cutting elements 102 are preferably arranged in groups or rows extending in helical relation so that adjacent cutting elements extend in different radial directions with respect to the axis of the drum 95 which mounts them. The elements 102 in each row are preferably spaced equally.

Each of the drums 95 is preferably closed at its outer end by an end plate 103 fixedly secured to the drum 95 by means of the bolts 104. Each end plate mounts a plurality of cutting members 105 projecting outwardly therefrom adjacent the periphery of the end wall 103. The end wall 103 may also carry a series of centrally positioned cutter members 106. Inasmuch as the inner ends of the two drums 95 are spaced apart, it may be desirable to provide cutters which will cut or break the coal confronting the center of the machine. Such cutting elements are best illustrated in Figs. 1 and 3 and may constitute rigid radially outwardly projecting plate members 107 carried by the inner end portions of the drums 95 and projecting longitudinally toward the center of the machine and each of which may be provided with tooth parts 108. The members 107 will be so positioned upon the two drums that they will interfit or freely mesh at the front end of the cutter. The extent to which the plates 107 project beyond the end of each drum 95 is less than the axial dimension of the parts 76, 78, as best seen in Fig. 3, so that when the plates are at the intermediate and rearmost positions they clear the housing part 72.

The main frame 45 mounts a pump 110, best seen in Fig. 1, which is driven by a motor 111. The pump 110 is connected to the various hydraulic mechanisms of the device, which have been described and others which will be hereinafter described, by hydraulic circuits (not shown) which are controlled by valves (not shown) having operating levers 112 arranged at a convenient part of the machine, preferably at the rear thereof. Also, at the rear of the machine are positioned electrical controls for the motors and electrical apparatus of the device, said electrical controls constituting switches preferably being housed in the control box 113.

*Operation*

In the operation of the device, the machine is brought to the working face with the cutting head foremost. The machine is capable of traveling under its own power by means of drive motors 33, 34 and the driving connection including the parts 35, 36 which serve to drive the two endless tracks or treads 32. Inasmuch as the drives to the two treads are independent of each other, it will be apparent that control of the direction of the machine is afforded by individually controlling the drive motors. Thus, where straight forward motion of the machine is desired, both motors will be caused to rotate at the same speed and to drive the two endless treads at the same speed; while, if the machine is to be turned, the drive to one endless tread can be energized while the drive to the other tread is held stationary or is rotated at reduced speed until such time as the treads assume the desired position, that is, face in the proper direction. As the machine moves forwardly freely, that is, when not working, the cylinder-piston units 67, 68 will preferably be so positioned as to hold the front ends of the arms 62, 63 above a normal position so that the cutter elements 102 and 107 upon the cutter heads will be held elevated above the floor or working surface of the mine and, therefore, will not interfere with travel of the machine. When the cutter heads are brought in contact with the mine face, the cylinder-piston units 67, 68 can be energized to lower the cutter heads onto the surface or floor of the mine.

When the machine is in a proper working position, the hydraulic controls for the cylinder-piston units 57, 58 are energized to cause movement of the pistons 58 to the left, as viewed in Figs. 2 and 5, so that the cross structure 54, 61 and associated parts illustrated in Figs. 5 and 6 are bodily moved forwardly of the machine guided by the sliding of the slide members 53 in the slide guides 52 of the frame. It will be understood that the cutter heads will be rotating at the time that the controls for the cylinder-piston units 57, 58 are energized. The cylinder-piston units 57, 58 serve to urge forwardly the parallelogram structures consisting of the arms 62, 63 and their related parts, including the cutter heads and the drive means for said heads. In the normal operation of the device, the forward movement, which is sometimes called a sumping operation, continues until the rotating heads have been driven into the face of the coal a distance of approximately one-half the diameter of the cutter heads. Thereupon the hydraulic controls to the cylinder-piston units 57, 58 are deenergized or operated to hold the piston 58 at the forward position of its stroke, and the operating controls of the cylinder-piston units 67, 68 are operated in a manner to cause said cylinder-piston units to swing the arms 62, 63 of the parallelogram structure which carries the cutters in an upward direction. The cutter heads are rotated or driven as the cylinder-piston units 67, 68 are operated, and, consequently, they perform a cutting or breaking operation as they are elevated. It will be apparent that, inasmuch as the width of the cut is greater than the width of the machine and that the elevation of the cutter will produce a cut of a height greater than the height of the machine, the successive operations of sumping and then elevating the cutter will result in the cutting of an opening of a dimension adequate to provide clearance for the forward travel of the machine by a single cut. It will be understood, however, that if cuts of greater width are desired, they can be accomplished by taking one cut at one part of the face and when moving the structure to engage the cutter heads with a laterally displaced part of the face, thereby cutting multiple widths by successive operations. The parallelogram arrangement holds the cutters in the same attitude at all elevations.

The operation of the cutter head illustrated in Fig. 3 is as follows: As the motor 71 rotates the spur gear 87 and the bevel gears 83, the shafts 81 are rotated by the meshing of the bevel gears 82 carried thereby with the bevel gears 83. The sleeves 91 rotated with the shafts 81 and, by virtue of the cams 90 and 92 upon said sleeves, this rotation of the sleeves serves to bodily move the cylinders 95 in eccentric or orbital paths. In this connection, the arrangement of the cams in the two cutter heads may be different by any angle found suitable, and I prefer that the cams upon the two cutters will be displaced approximately 180 degrees. Thus, when the cams upon the one cutter are positioned to offset or shift its drum forwardly of the axis of its shaft 81, then the eccentrics or cams of the other cutter will position its drum rearwardly of the axis of its shaft 81. The extent of eccentricity and the extent of throw provided by the eccentricity is illustrated by the center lines in Fig. 3, the center line 115 being the center line of the shaft 81 and hence the true center of the orbital path of the cutter, while the center lines 116 are the center lines of the drums 95. Thus it will be seen in Fig. 3 that the right-hand drum is in its forward position, while the left-hand drum is in its rearward position. As the bodily displacement of the drums 95 occurs incident to rotation of the cams 90, 92 of each cutter, the spur gears 98, 99 mesh at a continuously varying point 100 and, consequently, the drums 95 are rotated at low speed.

Figure 7:
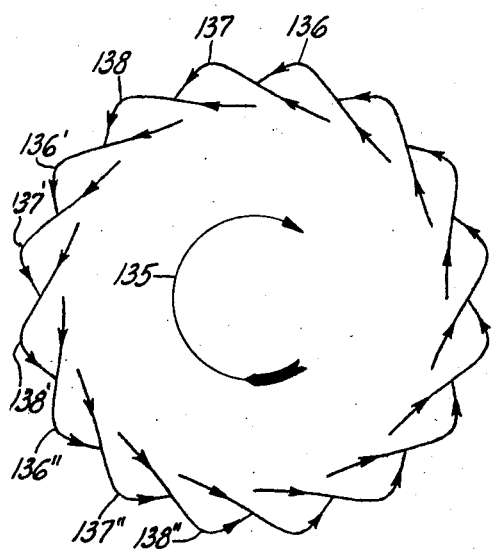
Fig. 7 is a diagrammatic view illustrating the motion and the cutting action of a device of the character shown in Fig. 3 which has three rows of cutting elements, the same being viewed at the end of a cutting element.
Figure 8:
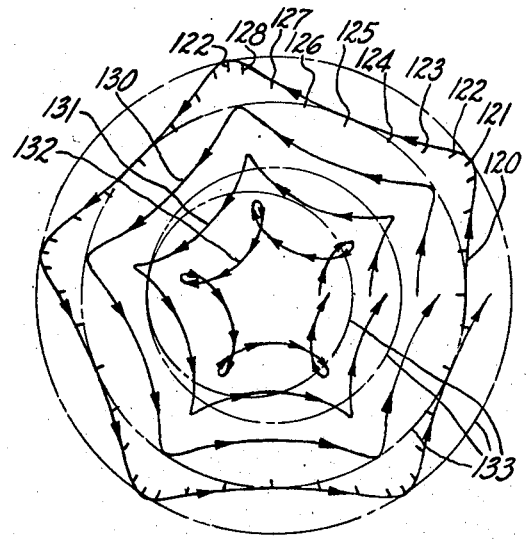
Fig. 8 is a schematic view similar to Fig. 7, illustrating another characteristic of the motion of the cutting head illustrated in Fig. 3.
Figure 13:
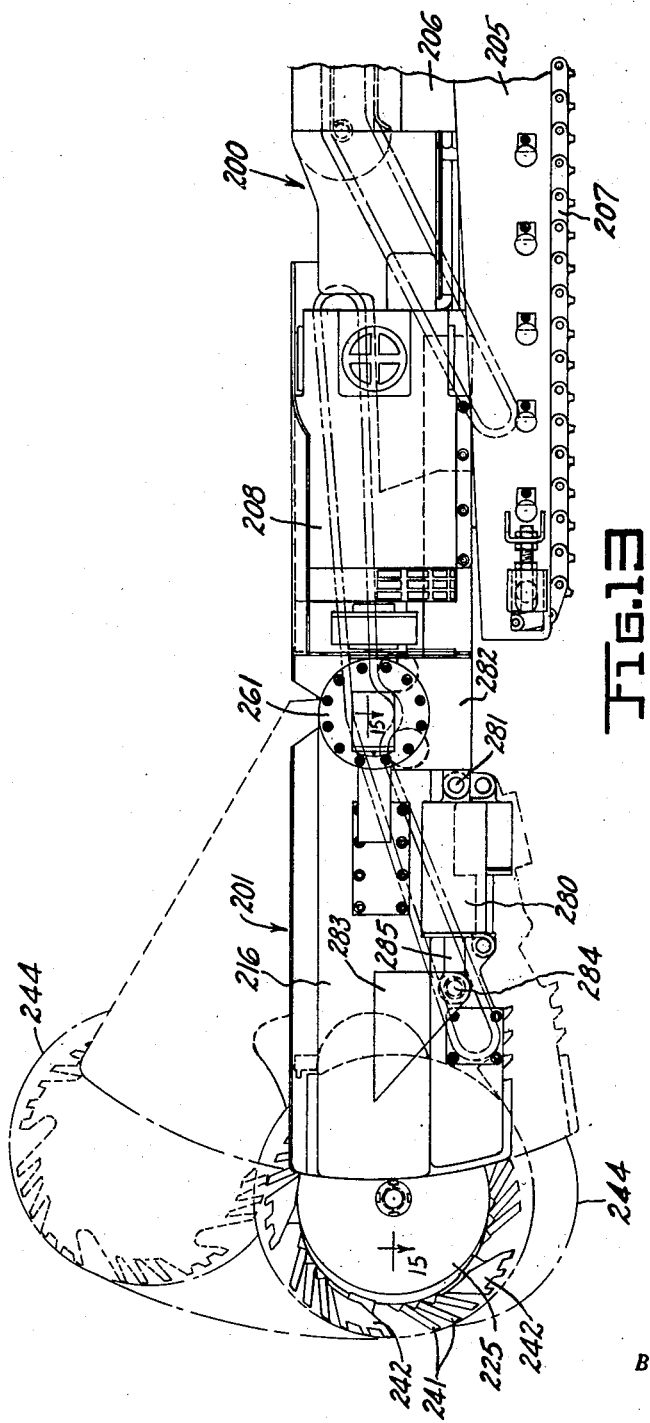
Fig. 13 is a side view of the front portion of the machine illustrated in Fig. 12.

The cutting action produced by this mechanism is best illustrated in Figs. 7, 8 and 11. Thus, when the shaft 81 is rotating in the direction illustrated by the arrows in Fig. 3, the cutting elements 102 upon the cylinder 95 follow a substantially cycloidal path, as best illustrated in Fig. 8. Considering the path of a single cutting element 102 and starting at point 120 of Fig. 8, the tip of the cutting element proceeds to point 121 and thence to point 122, etc. The points 121 and 122 indicate diagrammaticaly the positions at which the cutting element is projected at its greatest distance radially from the axis 115 of the shaft 81. The radial displacement of the successive points 121 and 122 indicates the extent of rotative travel of each cutting element between successive points of greatest projection; or, stated differently, designate the rotative travel of each cutter element 102 during one complete rotation of the shaft 81. The marks 122, 123, 124, 125, 126, 127 and 128 are points of equal time and illustrate diagrammatically that the rotative speed of each cutter 102 is slow adjacent each point of greatest projection, such as points 121 and 122, and increases progressively as the cutter element moves away from each point of maximum projection until it reaches a point of maximum retraction, and, thereafter progressively reduces as it approaches the next point of maximum projection. The gear ratios are preferably such that the number of rotations of the shaft 81 required to produce a complete revolution of the drum 95 and each individual cutter member 102 is not a multiple. In other words, as here shown, something more than five turns of the shaft 81 of Fig. 1 is needed to produce one complete rotation of the drum 95 and each cutter member 102 thereof. The avoidance of exact ratios is in general desirable, and it will be apparent that a considerable variation in motion of the individual cutter members 102 is possible by changing the amount of eccentricity of the cams 90, 92, the ratio of the spur gear 98 and the internal gear 99, and the number of rows or helices of the cutting elements 102 and also the spacing of the cutting elements in each helix or row.

In addition to illustrating the path of movement of each of the cutting elements 102, Fig. 8 illustrates the paths of the cutting elements at the ends of the cylinders or drums 95 spaced at different radial dimensions from the centers of the drums. The lines 130, 131 and 132 in Fig. 8 designate the paths of cutting members, such as the cutting members 105 and 106, as the same differ according to the radial spacing of each cutting element from the center of the drum. Attention is also directed to the fact that the arrows in Fig. 8 illustrate the path of movement, and to the fact that the circular lines 133 of Fig. 8 designate the pitch circles of the gears 98—99.

Fig. 7 illustrates diagrammatically the motion and cutting action of the cutting members 102 upon a cutting head having three rows or helices of cutters 102. In this figure the arrow 135 designates the direction of eccentric shaft rotation, while the other arrows in said figure designate the direction of rotation of the cutter members 102. Fig. 7 is in essence an illustration corresponding to a section through the drum or cylinder 95 in a plane at right angles to the drum axis. Fig. 7 illustrates the successive manner in which the various cutter members are projected to the cutting position.

In considering Fig. 7, assume that the point 136 designates the point of greatest projection of a cutting element 102 in a first row. This same cutting element then proceeds to the next succeeding point of greatest projection 136', then again to a next point of greatest projection 136" etc. The cutting element in the next succeeding row is at its greatest projection successively at the points 137, 137' and 137", etc. A cutting element in a third row is at its point of greatest projection at 138, and thereafter, successively, at points of greatest projection of 138, 138', 138", etc. It will be noted that in point of time the contact at point 136' precedes that at point 138, and that 138 precedes that at 137, and that at 137 precedes that at 136. This action allows the coal to be broken by the successive contact of the cutter members 102 with the coal falling freely by gravity as it is broken away from the working face.

Another advantage of this operation is that the shape of the cut which is made, as so described, during both the sumping and the shearing operation of the cutter heads, will induce the coal to roll onto a gathering mechanism. It is also apparent that, by reason of the latter action, if the coal does not roll to the gathering mechanism while shearing in an elevated position, the subsequent lowering of the cutting head will produce a raking action upon the coal which has been broken away to move it rearwardly toward a conveyor mechanism. This operation entails no extra or lost motion since each upward shearing cut will preferably be followed by the lowering of the cutting head for the next sumping cut.

Referring now to Fig. 11, this is a schematic composite view of the path of travel of the cutting elements in performing a forward sumping operation and is considered as if viewed through one of the drums 95 at right angles to the axis of the drums. The movement of the drum occurs longitudinally along the line 140 during the sumping operation, and the marks 141 indicate successive increments of longitudinal advance of the cutter head along path 140 upon successive rotations of shaft 81 during a sumping operation which normally is substantially equal to about one-half of the diameter of the drum. Observe in this view that the individual bites 142, 143, 144, 145, etc., taken at an elevation substantially at the level of the center line 140, are large, whereas those at 142', 143', 144' and 145' at both the top and the bottom of the cut during the sumping movement are comparatively small. While the latter, being smaller than average, would tend to produce small particles of coal, they constitute a small percentage of the total considered with reference to the total height of the cut. Thus, in the main, the shearing action is produced at the points 142, 143, 144 and 145, etc. in a manner to provide bites of reasonable size to insure the avoidance of excessive "fines" and to insure the shearing of lumps of good commercial size.

*Alternative cutter embodiment*

A slightly modified embodiment of the invention is illustrated in Fig. 4. In this embodiment of the invention the parts bear the same reference numerals as similar parts shown in Fig. 3. Observe in this construction that the spur gear 87, with which the bevel gears 83 are associated and which is mounted on the shaft 84, meshes with a spur gear 150 mounted on a transverse shaft 151 journaled in a housing part 152 and forming a part of the housing 72. The gear 150 has anchored thereto a bevel gear 153 which meshes with a bevel pinion 154 mounted on the shaft 155 of the motor 71. The bevel gears 83 mesh with the bevel gear 82 carried by the shaft 81 and rotating within the tube 79 having the annular enlarged flange 78 which is bolted to the frame part 76. The tube 79 has an external spur gear 156 adjacent to the annular member 78.

The sleeve 91 has the cam members or eccentrics 90 and 92 at its opposite ends and journals the drum 95 by means of the bearings 96 and 97. At its inner end the drum fixedly mounts an annular member 157 having an internal spur gear 158 adapted to mesh with the external spur gear 156 on the stationary sleeve 79 at the radial point 159. Observe that this construction has the helically arranged rows of cutter members 102 projecting from its circumference, the cutter members 105 and 106 projecting from its outer end, and the cutter bars or blades 107 at its inner end.

Figure 10:
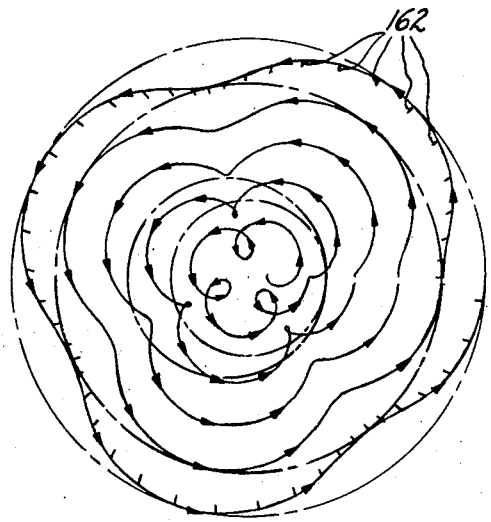
Fig. 10 is a diagrammatic view similar to Fig. 8, but illustrating the cutting action of the cutting head illustrated in Fig. 4.

The principal difference between this construction and that illustrated in Fig. 3 is that the external spur gear 156 is stationary while the internal spur gear 158, which meshes therewith, is attached to the drum, and hence is adapted to move. This is a transposition from the arrangement of the parts in Fig. 3. The result of this transposition is a movement or path of travel of the various cutting members, as illustrated in Figs. 9 and 10. It will be observed that the action is somewhat similar to the action of the cutting arrangement illustrated in Fig. 3, but that the orbital paths are different. Thus, as best seen in Fig. 9, the bites taken by successive teeth in successive helical rows are shallower than the bites provided by the Fig. 3 construction, as illustrated in Fig. 7. In this connection, in referring to Fig. 9, the arrow 135 indicates the direction of the rotation of the eccentric shaft, and the remaining arrows indicate the direction of rotation of the cutter teeth, which will be observed to be the same direction as the arrow 135 instead of the opposite direction as occurs in the Fig. 3 construction illustrated in Fig. 7.

The greatest difference of the Fig. 4 construction over the Fig. 3 construction is illustrated in Fig. 10, from which it will be apparent that the linear speeds of the tips of the cutting members 102, as indicated by the variation of spacing of the points 162, are greatest when said cutting members are projected from the axis of rotation of the shaft 81 at the maximum distance, and that at the position of maximum retraction, the speed of each cutting member is reduced. The path of each cutting element also is of different form, as best seen in Fig. 10. For the purpose of applying the greatest amount of power and also for the purpose of producing the largest cut or the largest size of coal particles, it will be apparent that the Fig. 3 construction has advantage over the Fig. 4 construction. In other words, the fact that the cutting members travel at their lowest speed when at maximum projection in the Fig. 3 embodiment enables them to exert greater force than is true in the Fig. 4 embodiment, thus insuring maximum utilization of power. Furthermore, the increased depth of the cuts taken by the embodiment in Fig. 3 insures that the size of the coal particles will be greater in the Fig. 3 construction.

In each of the Fig. 3 and Fig. 4 constructions, however, as well illustrated in Figs. 7 to 11, inclusive, it will be apparent that one characteristic of the device is that only one, or at most a very few, of the cutting members 102 are brought into contact with the coal face at one time. This enables the pressure exerted to be as great as necessary to break down coal without requiring the exertion of heavy pressures. In this connection, the fact that there is not an exact ratio between the rotation of the shaft 81 and that of the drums 95 insures that each projection of each of the drums in a forward breaking direction will present a different one or more of the cutter teeth of that drum into working engagement with the coal face, as illustrated in Fig. 11, as compared to the teeth presented upon other projections of the drum, with the result that there is a successive coal breaking action along the full width of the cut, and not a simultaneous breaking or cutting action extending full length of each drum. It will be apparent that, when the eccentrics of the two cutter cylinders 95 are angularly displaced, the cutting or breaking action of the two will alternate. This insures a uniform operation and the avoidance of the need for pressures greater than would be required for breaking coal at a comparatively small area of the face. This characteristic of the device is one of the primary advantages which is accomplished with the device.

*The embodiment of Figs. 12 to 16*

The embodiment of the invention illustrated in Figs. 12 to 16 constitutes a machine having a cutter which operates upon substantially the same principle as the cutter mentioned previously, but having a cutting width narrow compared to the overall width of the machine so that two or more passes are required to produce a cut of a width sufficient for the machine to advance therethrough. This machine also varies with respect to the nature of the conveyor which is employed and eliminates the use of gathering mechanism of the character required with the machine previously described. In this embodiment of the invention the mechanism comprises essentially three principal units, namely, a main frame unit 200, a front unit 201 and a rear unit 202.

The main unit 200 comprises a pair of laterally spaced endless track frames 205 supporting therebetween and interconnected by an intermediate frame part 206. Each endless track frame mounts means (not shown) for supporting and driving an endless track 207. It will be understood that the means for supporting and driving tracks or treads 207 may be of any character found suitable in the art, it being understood further that the drive means for the treads 207 will be such as to permit independent or individual control of said treads so that the speed and direction of movement of the entire mechanism may be governed by selective and individual control of the drive mechanism to the two treads. The main frame unit 200 mounts a pair of electric motors 208 positioned at the opposite sides thereof and adapted for purposes to be described.

A turntable 209 is journaled upon the central portion of the main frame 200 about a vertical axis and is provided with a gear sector 210 with which mesh spur members 211 and 212. The intermediate part 206 includes an arcuate internal sector 213 with which the gears 211 and 212 mesh. Suitable drive means (not shown) operate the gears 211 and 212 for the purpose of rotating the turntable 209. The gear sector 213 on the main frame meshes with the gears 211 and 212. This arrangement protects the hydraulic lines and electrical conduits which extend between the main frame unit 200 and the rear frame unit 202. The intermediate frame part 206 includes a bin 214.

The front frame 201 is carried by the turntable 209 and includes laterally spaced rigid upright frame parts 216 receiving an intervening upwardly rearwardly inclined ramp portion 217 therebetween and mounting a forwardly facing concavo-convex cross-member 218 connecting the forward ends of the side frame parts 216. The cross frame member 218 preferably has a vertically concaved forward part-cylindrical plate and may mount spray nozzles 219 connected with a source of liquid under pressure. The frame members 216 are trunnioned or pivoted about a transverse vertical axis by the structure illustrated in Fig. 16. This structure includes a pair of annular trunnion members 220 which form a part of a rigid cross yoke (not shown) having a guided sliding support upon the turntable 209 and being positioned by cylinder-piston units 221 in either a normal retracted position, as shown in Fig. 14, or projected forwardly relative to the turntable for a sumping operation. Annular bearings 222 are carried by lateral spacers 223 projecting from the rear ends of the frame arms 216, and these annular bearings 222 are rotatable within the annular trunnions 220 at the opposite sides of the device so as to accommodate vertical swinging of the arms 216 about a transverse axis at their rear ends.

The cutter

The two forwardly projecting arm frame parts 216 have front terminal portions 225 which mount the opposite ends of a cross shaft 226 which rigidly interconnects the front ends of the arms 216. The shaft 226 mounts the cutting head which is constructed in the manner best illustrated in Fig. 15. Bearings 227 mounted on opposite ends of the shaft 226, preferably at a reduced diameter end portion thereof as shown, serve to journal a tubular member 228 concentric with and preferably having clearance with the shaft 226. A plurality of cams are mounted upon the sleeve 228, there preferably being two sets of such cams, each set preferably consisting of two cams. Thus, as illustrated in Fig. 15, two cams 229 are arranged in longitudinally spaced relation on one end portion of the sleeve 228, and the opposite end portion will have a similar set of cams 230. The cams 229 and 230 are preferably circular and are fixed upon the sleeve 228 eccentrically of the axis of that sleeve. The cams 229 are offset from the tube or sleeve 228 oppositely to the direction in which the cams 230 are offset from said shaft, and, in the preferred embodiment, the cams 229 will be displaced 180 degrees from the cams 230.

A pair of cylindrical cutter drums 231 and 232 are journaled upon the cams by means of bearings 233. Each drum preferably includes an inner annular flange 234 whose radial dimension is greater than the maximum eccentricity or throw of the cams. The flanges or walls 234 are flat and extend radially thereof and are adapted for flat face sliding engagement with one another.

The outer end of each cylinder or drum 231 and 232, as here illustrated, has bolted or otherwise fixedly secured thereto a flat annular plate part 236 from whose inner marginal portion projects outwardly a cylindrical flange 237 concentric with the drum. An external spur gear 238 is carried by each flange 237. Each arm projection 225 has secured thereto an annular spur gear member 239 arranged concentric of the shaft 226. Inasmuch as the spur gear 238 is concentric with the drum which mounts it and is eccentrically arranged relative to the shaft 226, it will be apparent that the spur gears 238 and 239 will mesh at only one point 240 of their respective circumferences.

Each of the drums 231 and 232 will carry a plurality of spikes, chisels or other cutting members 241 which project substantially radially and are spaced from each other and preferably arranged in a plurality of helical rows, as best illustrated in Fig. 14. At their outer ends the drums 231 and 232 preferably mount platelike cutters 242 which project longitudinally beyond the end of the drum and which are preferably positioned in an oblique or helical arrangement and include projecting teeth 243 at the outermost surface. The cutting elements 241 and 242 are so arranged that they are adapted in use to break or cut in a pattern, as outlined by dotted lines 244 in the different figures. Thus by referring to Fig. 13, it will be seen that a semi-cylindrical cut is defined by the cutter head, the length of which cut, as seen in Fig. 14, is greater than the spacing of the outer surfaces of the arm end portions 225. The cutting contours of the two parts vary because of the eccentric relation of the cutter heads or drums 231 and 232, as best seen in Fig. 15. The operation of the cutter head of this construction is substantially the same as that illustrated in Fig. 3 and is characterized by the same principles as explained above and as illustrated in Figs. 7 and 8. Likewise, the character in which the cut is made progressively as the head is advanced during a sumping operation is illustrated in Fig. 11, it being understood that the operation illustrated in Figs. 7, 8 and 11 contemplates a positive drive of the cutter heads.

Figure 16:
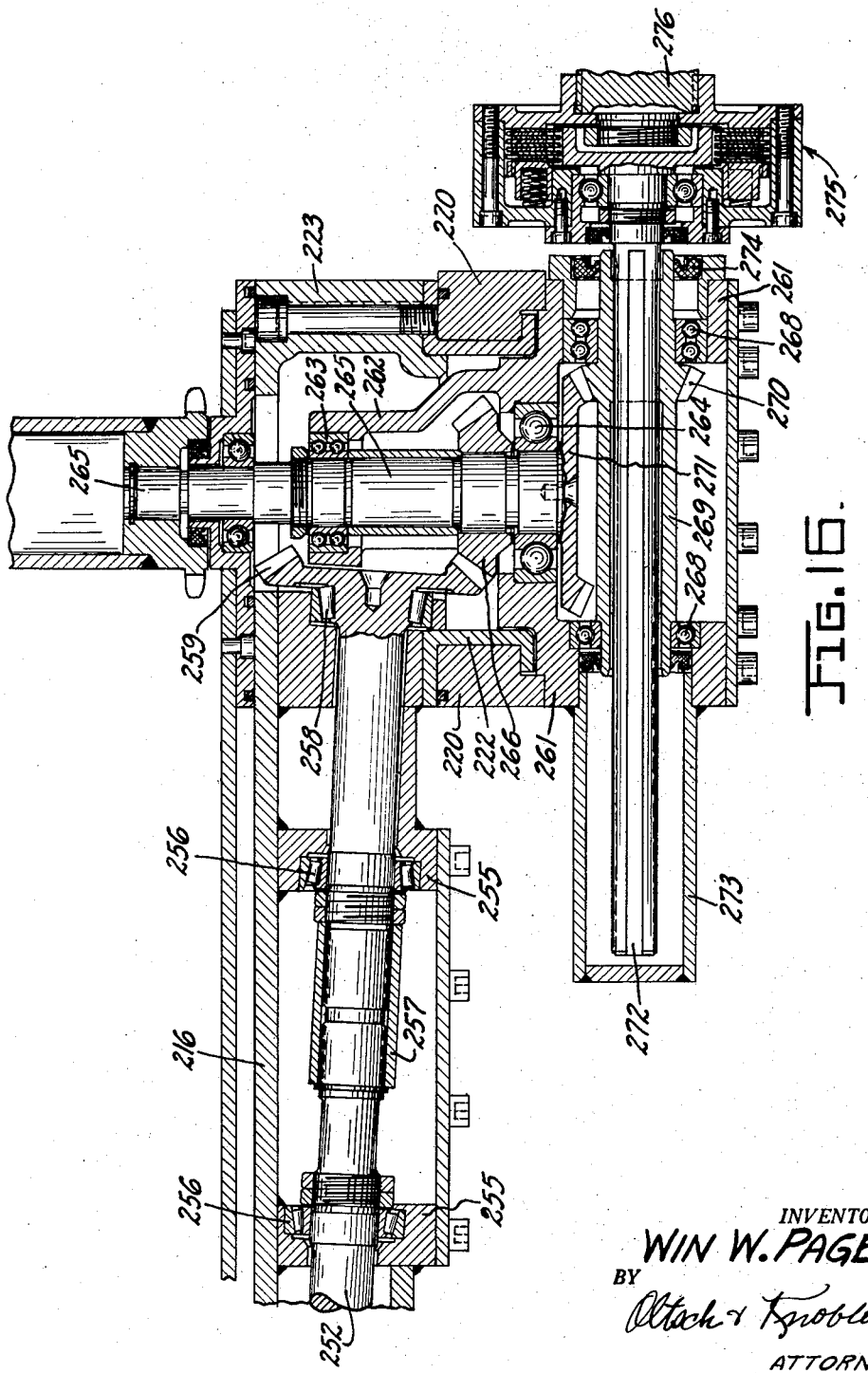
Fig. 16 is a fragmentary detail sectional view taken on line 15—15 of Fig. 13.

The cutter heads may be driven through a mechanism as best illustrated in Figs. 15 and 16. As here illustrated, the driving means for the cutter head is effected by the two motors 208, but it will be understood that, if desired, a single drive mechanism may be employed. Where two drive mechanisms are employed, they will be complementary and positioned at opposite sides of the machine. A bevel gear 250 is mounted on the outer end of the tube 228 and meshes with a bevel gear 251 mounted upon the forward end of an elongated drive shaft 252. The arm portions 216 of the device are preferably hollow and the shaft 252 extends longitudinally therethrough, the forward end of said shaft preferably being journaled in a bearing 253. The hollow arm will preferably include an offset or cap portion 254 between its forward end and the forward projection 225 which is laterally inset, as seen in Fig. 15, so as to house and protect the drive mechanism. At spaced points along its length the arm 216 is preferably cross-braced as at 255, as seen in Fig. 16, and bearings 256 which are carried at those cross-braced parts 255 journal intermediate portions of the shaft. The shaft may be of sectional character with the parts interconnected by a sleeve 257. The rear end of the shaft 252 is journaled in a bearing 258 and mounts a bevel gear 259.

The cross frame member, which mounts the annular trunnion 220 about which the arms 216 are pivoted, includes drumlike housings 261 whose axis is substantially concentric with the trunnion 220 and which projects axially and outwardly relative to said trunnion. A reduced inwardly projecting bracket 262 is carried by each drum part 261 to extend within the annular bearing 222 journaled in the trunnion 220 and also to extend into the annular rear portion 223 on each arm 216. Aligned bearings 263 and 264 are carried by each bracket 262 and drum housing 261 serve to journal the shaft 265. The shaft 265 mounts a bevel gear 266 which meshes with the bevel gear 259.

The drum-type housing 261 mounts a plurality of bearings 268 in longitudinally spaced relation which journal an elongated tube or sleeve 269 which is preferably internally splined. The tube or sleeve 261 extends perpendicular to the axis of the shaft 265. A bevel gear 270 is carried by the splined sleeve 269 and meshes with a bevel gear 271 carried by the outer end of the shaft 265. An elongated longitudinally extending splined shaft 272 is slidable longitudinally in and keyed to the sleeve 269. To receive the forward end of the shaft 272, which is of a length substantially greater than the diameter of the drum-type housing 261, that housing 261 is provided with a longitudinal cup-shaped or tubular extension 273 at its forward end. An opening aligned with the cup member 273 is formed in the rear portion of the drum-type housing 261 and is closed by a seal member 274 which encircles the splined tube 269. The splined shaft 272 has connection, by means of a slipping clutch 275, with the drive shaft 276 of the motor 208.

The operation of the cutter will be substantially as follows: Assuming that the cutter head is in the full line position illustrated in Fig. 13 and that the drive motors 208 for the cutter head are operating, the sumping action of the device may commence by a forward projection of the cutter heads and their mounting arms and associated mechanism by operation of the sumping cylinder-piston unit 221. This movement can continue for a distance approximately equal to the radius of the cutter head, it being understood that the limit of this action in the construction defined is dependent upon the spacing of the cap portion 254 at the front end of each arm 216 from the foremost cutting point of the cutter head. During the sumping operation the mechanism illustrated in Fig. 16 is urged forwardly relative to the clutch 275 and the shaft 276 whose continued rotation is transmitted to the shaft 272 during the sumping operation. As the sleeve 269 splined on the shaft 272 slides forwardly upon the shaft, it is rotated thereby and transmits its rotation through bevel pinion 270, bevel gear 271, shaft 265 and bevel gears 266 and 259 to the shaft 252. The rotation of the shaft 252 is in turn transmitted by the meshing bevel gears 251 and 250 to the tube or sleeve 228 which extends axially through the cutter head and which mounts the cam sets 229 and 230. The rotation of these cam sets moves the drums 231 and 232 in the cutting paths illustrated in Figs. 7, 8 and 11. In cases where the meshing gears 238, 239 are provided, the drums or cylinders 231 and 232 are positively driven or rotated at a reduced speed compared to the speed at which the sleeve 228 rotates. The operation of the cutter breaks down the coal substantially as explained above with reference to the device illustrated in Fig. 3.

When the sumping operation has been completed and the shearing cut is to be made by an upward pivoting of the forward ends of the cutter head carrying arms 216, the cylinder-piston units 280 at opposite sides of the machine are actuated. These units are preferably double-acting hydraulic units, each being pivoted at 281 at one end to a forward part 282 of the cross frame mechanism which mounts the trunnions 220 and the drum housing part 261. Laterally projecting parts 283 carried by the forward lower ends of the arms 216 have pivotally connected thereto at 284, in longitudinally forwardly spaced relation to the pivot point 281, the opposite end of the cylinder-piston 280, here illustrated as the piston shaft 285. It will be apparent, therefore, that as the cylinder-piston unit 280 is operated to extend the same, the arms 216 are swung upwardly from the full line position shown in Fig. 13 to the upper dotted line position illustrated in Fig. 13. Likewise, retraction of the cylinder-piston unit 280 will lower the arms 216, as to the bottom extent illustrated in dotted lines. It will be apparent that the drive to the shaft 252 can continue during the pivoting of the arms 216 by virtue of the fact that parts of the drive mechanism, including the bevel pinions 266 and 271, rotate about the same transverse axis upon which the arms 216 pivot. Consequently, as rotation of the shaft 272 continues while the arms 216 are being pivoted, the cutting action of the device likewise continues and a cut can be made at a desired height.

It will be apparent that the device, when constructed as illustrated in Figs. 12 to 16, operates upon substantially the same principle as the previous embodiment. The cut made by the cutter head is narrower than the machine so the device will not cut its own passage. However, the cut is effected through movement of the tips of the cutting members in a substantially cycloidal path incident to the forward sumping of the cutter head to a depth approximately one-half the diameter of the cutter and also incident to upward swinging of the head to effect a shearing cut of the desired height. Several such cuts, made side by side, are required in order to make a cut of a lateral dimension sufficient to provide clearance for the machine. The device is easily adjusted to make such lateral space cuts, however, by virtue of maneuverability of the turntable and of the endless-track-mounted tractive vehicle part or main unit 200 of the device. As far as the cutting action itself is concerned, the helical arrangement of the cutting members upon the cutter drum, coupled with the bodily shifting of the drum in an orbital path while that drum at the same time is rotating about its axis, holds to a small number the points at which pressure is applied to the working face for breaking purposes. This minimizes the bracing or forward thrust force which is required to be exerted, since it enables the cutter to break down the coal from the face, figuratively in a chip-by-chip manner, rather than in a manner entailing simultaneous breaking of the coal at the face at a number of points.

Summary

While various embodiments of the invention have been illustrated herein, the construction of the device may be changed in other particulars falling within the scope of the appended claims without departing from the spirit of the invention. Thus the cutter head thereof may be mounted upon a simple swinging arm structure instead of a parallelogram like construction. Various other features of the device may be changed. Thus, the vertical tilting or adjustability of the front end of the conveyor may be omitted for purposes of simplicity of construction.

While the cutter head mechanism, as disclosed in Figs. 3, 4 and 15 hereof, all include means for positively rotating the carrier members which mount the cutting teeth, spikes or plates, and specifically the gears 98, 99 in Fig. 3, the gears 156, 158 in Fig. 4 and the gears 238 and 239 in Fig. 15, it will be understood that such drive means are not essential. In this connection it will be apparent that, if such positive gear drive means is omitted in these devices, the cutter head will function, nevertheless, and will produce substantially effective operation by reason of the fact that the very engagement of the cutter members with the mine face while the cutter heads are caused to move bodily in an orbital path will necessarily produce a rotation of the cutter heads and thus will cause successive cutter teeth to be presented to the working face incident to operation of the cutter heads.

I claim:

1. In a mining machine, a cutter comprising a support, a rotatable member, a plurality of circumferentially spaced cutting elements carried by said rotatable member and projecting substantially radially outwardly therefrom, an eccentric member rotatably carried by said support, said rotatable member being journaled by said eccentric member on an axis displaced from and parallel to the axis of said eccentric member, means for rotating said eccentric member and means for rotating said rotatable member.

2. In a mining machine, a cutter comprising a support, a rotatable member, a plurality of spaced cutting elements carried by said rotatable member and projecting substantially radially outwardly therefrom, an eccentric member rotatably carried by said support, said rotatable member being journaled by said eccentric member on an axis displaced from and parallel to the axis of said eccentric member, means for rotating said eccentric member, and means for rotating said rotatable member, said cutting elements being arranged in a plurality of helical rows.

3. In a mining machine, a cutter comprising a support, a rotatable member, a plurality of spaced cutting elements carried by said rotatable member and projecting substantially radially outwardly therefrom, an eccentric member rotatably carried by said support, said rotatable member being journaled by said eccentric member on an axis displaced from the axis of said eccentric member, means for rotating said eccentric member, said rotatable member constituting a substantially cylindrical drum whose axis is parallel to the axis of said eccentric member, and means for rotating said rotatable member.

4. In a mining machine, a cutter comprising a support, a rotatable member, a plurality of spaced cutting elements carried by said rotatable member and projecting substantially radially outwardly therefrom, an eccentric member rotatably carried by said support, said rotatable member being journaled by said eccentric member on an axis displaced from the axis of said eccentric member, means for rotating said eccentric member, and interfitting and meshing gears, including an outer ring gear having internal teeth, said gears being carried respectively by said support and said rotatable member and being concentric respectively with the axis of said eccentric member and with the axis of said rotatable member.

5. In a mining machine, a cutter comprising a support, a drum, a plurality of circumferentially spaced cutting teeth carried by and projecting outwardly from said drum, means for journaling said drum including a cam, means for rotating said cam to bodily shift said drum, and means for rotating said drum.

6. In a mining machine, a cutter comprising a support, a drum, a plurality of spaced cutting teeth carried by and projecting outwardly from said drum, means for journaling said drum including a cam, means for rotating said cam to bodily shift said drum, and eccentrically arranged meshing gears carried by said support and said drum.

7. In a mining machine, a cutter comprising a support, a drum, a plurality of spaced cutting teeth carried by and projecting outwardly from said drum, means for journaling said drum including a cam, means for rotating said cam to bodily shift said drum, and eccentrically arranged meshing gears carried by said support and said drum, said teeth being arranged in a plurality of helical rows, said rows being equispaced perimetrally of said drum, said gears constituting a speed reducer having a ratio to provide a number of revolutions of said cam rotating means for each drum revolution, different than the number of said helical rows.

8. In a mining machine, a cutter comprising a support, a drum, a plurality of spaced cutting teeth carried by and projecting outwardly from said drum, means for journaling said drum including a cam, means for rotating said cam to bodily shift said drum, and eccentrically arranged meshing gears carried by said support and said drum, said gears constituting a speed reducer producing a plurality of complete revolutions plus a fractional revolution of said cam rotating means for each full revolution of said drum.

9. In a mining machine, a cutter comprising a support, a drum, a plurality of spaced cutting teeth carried by and projecting outwardy from said drum, means for journaling said drum including a cam, means for rotating said cam to bodily shift said drum, and eccentrically arranged meshing gears carried by said support and said drum, said teeth being arranged in a plurality of equispaced helical rows so related that each tooth is substantially equally spaced from adjacent teeth in both rotative and counter-rotative directions a predetermined amount, the tips of said teeth being equispaced from the axis of the drum and differently spaced from the axis of the cam rotating means.

10. In a mining machine, a support, a rotatable carrier, a plurality of circumferentially and axially spaced cutter members projecting outwardly from said carrier, means for rotating said carrier about its axis, and driving means for bodily shifting said carrier on said support in an orbital path, said means including a cam and cooperating to shift the tips of said teeth in a substantially cycloidal path extending around the axis of the carrier and differing upon each revolution.

11. In a mining machine, a support including a shaft, a pair of drums arranged end to end upon said shaft, a plurality of circumferentially spaced cutter members carried by each drum, a pair of angularly displaced eccentric members fixedly carried by said shaft, said eccentric members journaling said drums, means for rotating said shaft, and means for rotating said drums.

12. In a mining machine, a support including a shaft, a pair of drums arranged end to end upon said shaft, a plurality of spaced cutter members carried by each drum, a pair of angularly displaced eccentric members fixedly carried by said shaft, said eccentric members journaling said drums, means for rotating said drums and means for rotating said shaft, said cutter members being arranged upon each carrier in a plurality of helical rows.

13. In a mining machine, a support including a shaft, a pair of drums arranged end to end upon said shaft, a plurality of circumferentially spaced cutter members carried by each drum, a pair of angularly displaced eccentric members fixedly carried by said shaft, said eccentric members journaling said drums, means for rotating said drum and means for rotating said shaft, said cutter members including blades projecting longitudinally at the outer end of each drum.

14. In a mining machine, a support, a carrier, a plurality of circumferentially spaced cutter members projecting outwardly from said carrier, means for rotating said carrier about its axis, a cam, driving means for bodily shifting said carrier on said support in an orbital path, said cam and means cooperating to shift the tips of said teeth in a substantially cycloidal path extending around the axis of the carrier, and a curved plate carried by said support adjacent to the rear portion of said carrier with its concave face confronting said carrier and having a predetermined minimum clearance with the tip portions of said cutter members.

References Cited in the file of this patent

UNITED STATES PATENTS

| Number | Name | Date |
|---|---|---|
| 773,882 | Millward | Nov. 1, 1904 |
| 779,442 | Richmond et al. | Jan. 10, 1905 |
| 1,143,897 | Flexner et al. | June 22, 1915 |
| 1,148,974 | Kuhn et al. | Aug. 3, 1915 |
| 1,276,249 | Morgan | Aug. 20, 1918 |
| 1,336,440 | O'Toole | Apr. 13, 1920 |
| 1,880,091 | Hughes | Sept. 27, 1932 |
| 2,210,919 | Joy | Aug. 13, 1940 |
| 2,329,875 | Cartlidge | Sept. 21, 1943 |
| 2,495,840 | Findlater | Jan. 31, 1950 |
| 2,520,040 | Levin | Aug. 22, 1950 |
| 2,531,072 | Merchant | Nov. 21, 1950 |
| 2,653,806 | Robbins | Sept. 29, 1953 |
| 2,694,562 | Snyder et al. | Nov. 16, 1954 |

FOREIGN PATENTS

| Number | Country | Date |
|---|---|---|
| 616,779 | Germany | Aug. 8, 1935 |